3,054,718
TRIS(α-HYDROXY-β,β,β-TRICHLOROETHYL) PHOSPHINE AND FUNGICIDE
Irving Gordon and Charles F. Baranauckas, Niagara Falls, N.Y., assignors to Hooker Chemical Corporation, Niagara Falls, N.Y., a corporation of New York
No Drawing. Filed Nov. 16, 1959, Ser. No. 852,948
12 Claims. (Cl. 167—22)

This invention relates to the reaction of halogenated aldehydes with phosphine, and the novel and useful products produced thereby.

J. de Girard in Comptes Rendus, vol. 102, pp. 1113–1116 (1886) discloses the reaction of chloral hydrate with phosphonium iodide to produce a secondary phosphine, bis(α-hydroxy-β,β,β-trichloroethyl) phosphine. Such a reaction is impractical from a commercial standpoint because of the expense involved in the use of phosphonium iodide as a reactant. Only a secondary phosphine can be prepared by this technique.

It is an object of this invention to provide new and useful compositions of matter.

It is another object of this invention to provide a novel method of preparing new fungicidal compositions.

Still another object of the invention is to provide a novel method of preparing tertiary phosphines from halogenated aldehydes and phosphine.

A further object of the invention is to provide a method of preparing tris(α-hydroxy-β,β,β-trichloroethyl) phosphine.

These and other objects of the invention will be apparent from the following detailed description of the invention.

It has now been discovered that when certain halogenated aldehydes are reacted with phosphine in an acidic medium, tertiary phosphines having fungicidal properties are produced thereby.

More in detail, any halogenated aldehyde capable of forming a tertiary phosphine when reacted with phosphine under the reaction condition set forth below, may be employed as a reactant in the instant novel process. Suitable halogenated aldehydes include chloral $$(CCl_3CHO)$$

the corresponding bromine, iodine and fluorine substituted aldehydes, hydrates of these compounds, and mixtures thereof. The halogenated aldehyde is preferably employed as an aqueous solution containing between about ten and about seventy-five percent by weight of the halogenated aldehyde, but more concentrated or more dilute solutions can be employed if desired.

Gaseous phosphine ($PH_3$) is reacted with the halogenated aldehyde by contacting the gas with a halogenated aldehyde solution under the acidic conditions and the agitation conditions described more fully hereinafter.

Sufficient acid is added to the halogenated aldehyde solution to maintain a pH in the resulting acidified solution of preferably about 2.0 or lower. However, a pH as high as 4.0 can be employed if desired. Suitable acids include hydrochloric acid, phosphoric acid, dilute sulfuric acid, hydrobromic acid, formic acid, dichloroacetic acid and mixtures thereof. Any strong inorganic acid or organic acid which is non-oxidizing under the reaction conditions obtained, can be employed to adjust the pH to within the desired range. The acid may be added in anhydrous form or as a solution. For example, gaseous hydrogen chloride may be bubbled into the halogenated aldehyde solution simultaneously with the gaseous phosphine in a proportion sufficient to maintain the pH at about 4.0 or lower.

Sufficient water and/or other polar solvents should be present in the resulting acidic halogenated aldehyde solution to provide a solvent content in the solution of between about twenty-five and about ninety percent by weight. When the solvent content is less than about twenty-five percent by weight, the resulting solution may become highly viscous after reacting with phosphine, thereby inhibiting the contacting of phosphine with the halogenated aldehyde in the resulting slurry. When the solvent content is in excess of about ninety percent by weight, the solution may be too dilute to obtain optimum contact of the gaseous phosphine with the halogenated aldehyde in the solution. However, any solvent content which permits a satisfactory yield of halogenated tertiary alkyl phosphine may be employed. The solvent may be added in substantially pure form, but is preferably added with the reactants as a halogenated aldehyde solution and/or as an acidic solution. If desired, the acidic solution and wash solution remaining after separation of the solid product obtained as described more fully hereinafter, may also be employed as a solvent source.

Although water is the preferred solvent for the chlorinated aldehyde and acid reactants, any other suitable polar solvent such as the lower water soluble alcohols (methanol, ethanol and propanol), ether, dioxane, and the like may be employed to replace all or part of the water as solvent.

It is preferred to vigorously agitate the acidic halogenated aldehyde solution while bubbling gaseous phosphine, or gaseous phosphine and gaseous acid, as the case may be, through the solution in order to permit maximum contact of the solution with the gas or gases, and thereby obtain optimum yields of the product. However, any suitable contacting or agitating means that permits a satisfactory yield of the product can be employed. For example, a conventional spray tower in which the solution passes in countercurrent flow with a phosphine atmosphere may be employed.

The reaction is preferably carried out at room temperature, but higher or lower temperatures can be employed if desired. For example, satisfactory yields are obtained when the reaction is carried out at temperatures between about ten and about ninety degrees centigrade, but any reaction temperature which gives satisfactory product yields can be employed.

When chloral and phosphine are employed as the reactants, the reaction is believed to proceed in accordance with the following equation:

$$3CCl_3CHO + PH_3 \longrightarrow \left(\begin{array}{c} HOCH \\ | \\ CCl_3 \end{array}\right)_3 P$$

It can be seen from the above equation that at least three moles of the halogenated aldehyde per mole of phosphine are necessary to complete the reaction. It is desirable to employ an excess of the halogenated aldehyde, for example, an excess of between about ten and about twenty percent of the stoichiometric proportion required to form the tertiary phosphine. However, an excess of the halogenated aldehyde that is consistent with economic recovery of the tertiary phosphine product may be employed.

The tertiary halogenated alkyl phosphine produced by the reaction is isolated from the resulting reaction mixture by filtration, decantation, evaporation of solvent or other suitable means.

The isolated product may be purified by washing with a suitable liquid, such as water, which will leach acid and aldehyde adhering to the product without dissolving any significant amount of the product.

Various modifications of the process can be employed For example, the process can be carried out continuously or batchwise. Furthermore, unreacted phosphine gas passing out of the solution can be collected and recycled for reaction with the same or another acidic halogenated aldehyde solution. In addition, after separation of the solid product, the resulting mother liquor and wash solution can be employed to prepare fresh aldehyde solution and/or fresh acid solution.

The novel compound of this invention is capable of being used in finely divided form as a fungicide or may be diluted with a solvent such as benzene to form solutions or dispersions which are effective soil fungicides and foliar fungicides. This novel fungicide may be applied by any of the conventional methods. For example, it may be used in equeous emulsions or may also be incorporated in organic liquids such as the aromatic hydrocarbons for spraying purposes. It may also be effectively used in dusts with such inert solid diluents as kieselguhr, wood flour, comminuted walnut shells, talc and the like. Thus the diluent can readily be selected from the group consisting of: water, benzene, kieselguhr, wood flour, comminuted walnut shells and talc. The novel compound may be employed in fungicidal formulations which contain an adjuvant such as a wetting agent. Known fungicides, such as tetrachlorothiophene, sulfuryl fluoride, calcium lignosulfonate, sodium lignate, manganese ethylenebisdithiocarbamate, zinc ethylenebisdithiocarbamate, and the like, may also be admixed with the novel compound of this invention to provide improved fungicidal control.

The novel compound may also be employed as a chemical intermediate. The following examples are presented to define the invention more fully without any intention of being limited thereby. All parts and percentages are by weight unless otherwise specified.

Example 1

One mole (about 147.4 grams) of chloral was dissolved in 147.4 grams of water and this solution was admixed with fifty grams of concentrated hydrochloric acid (thirty-seven perecnt HCl). Gaseous phosphine was passed through the resulting solution at room temperature, while vigorously agitating the solution, until precipitation was substantially complete. The white crystalline product which precipitated from the solution was recovered by filtration, washed with water, and dried under vacuum at a temperature of about twenty-five degrees centigrade. The resulting pure dry tris($\alpha$-hydroxy-$\beta,\beta,\beta$-trichloroethyl) phosphine weighed three hundred and fifty-seven grams, indicating a yield of about seventy-five percent. Chemical analyses of the product showed the following composition:

|  | Theoretical | Observed |
|---|---|---|
| Percent C | 15.13 | 15.40 |
| Percent H | 1.27 | 1.40 |
| Percent Cl | 67.0 | 67.13 |
| Percent P | 6.51 | 6.62 |
| Molecular weight | 476.2 | 500±50 |
| Melting point, °C | | 165.5–166.5 |

Infrared spectrum obtained from this product showed that C—OH, C—H, and C—Cl bonds were all present in the structure. Infrared analysis also showed that P—H bonds and P—O—C bonds were absent in the structure of the product.

Example 2

The product of Example 1 was tested as a soil fungicide, in accordance with the following procedure.

Five pea seedlings were placed in a three inch diameter pot containing soil infested with *Pythium ultimum*. Twelve point five milligrams of tris($\alpha$-hydroxy-$\beta,\beta,\beta$-trichloroethyl) phosphine were dispersed in fifty milliliters of water and two milliliters of an 0.5 percent solution of a commercial wetting agent, and the resulting dispersion was added to the pot. This proportion was equivalent to about twenty parts of fungicide per million parts of soil. All of the seedlings survived in this test, showing complete control of the soil fungicide with the product of Example 1. No phytotoxicity was noted on the pea seedlings in this test, or in tests in which rates greater than 12.5 milligrams per pot were employed.

For purposes of comparison, the procedure was repeated, employing N-trichloromethylmercaptotetrahydrophthalimide as the fungicide, at a rate of 12.5 milligrams per pot. Complete control of the fungus was also obtained with this fungicide.

For purposes of further comparison, the procedure was repeated, but no fungicide was employed. All of the pea seedlings were destroyed in this test.

Example 3

The product of Example 1 was dispersed in a solution of one hundred milliliters of water and 2.5 milliliters of an 0.5 percent solution of a commercial wetting agent, the resulting dispersion containing four hundred parts of tris($\alpha$-hydroxy-$\beta,\beta,\beta$-trichloroethyl) phosphine per million parts of dispersion. A young tomato plant was rotated on a turn table and the leaf surfaces were covered with the dispersion. The dispersion was dried and the plant was inoculated with spores of *Alternaria solani*, a foliar fungus.

For purposes of comparison, the procedure was repeated, employing a dispersion of N-trichloromethylmercaptotetrahydrophthalimide as the fungicide in the ratio of four hundred parts per million.

For purposes of comparison the procedure was repeated with the exception that the plant was not treated with a fungicide.

The three plants were then placed in a humidified chamber and the fungus was permitted to develope. When extensive leaf damage developed on the plant that was not treated with fungicide, the two fungicide-treated plants were examined to determine the degree of repression of leaf damage. The results were as follows:

| Fungicide: | Percent control at 400 p.p.m. |
|---|---|
| Tris($\alpha$-hydroxy-$\beta,\beta,\beta$-trichloroethyl) phosphine | 95 |
| N-trichloromethylmercaptotetrahydrophthalimide | 95 |

It will be recognized that various modifications within this invention are possible, some of which have been referred to above. However, we do not wish to be limited except as defined by the appended claims.

We claim:
1. Tris($\alpha$-hydroxy-$\beta,\beta,\beta$-trichloroethyl) phosphine.
2. The process of preparing tris($\alpha$-hydroxy-$\beta,\beta,\beta$-trichloroethyl) phosphine which comprises reacting chloral with phosphine in an acidic medium.
3. The process of claim 2 wherein said acidic medium has a pH of less than about four.
4. The process of claim 2 wherein said acidic medium has a pH of less than about two.
5. The process of claim 2 wherein the molar ratio of said chloral to said phosphine is at least about 3:1.
6. The process of preparing tris($\alpha$-hydroxy-$\beta,\beta,\beta$-trichloroethyl) phosphine which comprises admixing an aqueous chloral solution with sufficient strong, non-oxidizing acid to adjust the pH of the resulting acidified solution to less than about four, admixing phosphine with said acidified solution in a proportion equivalent to at least three moles of chloral per mole of phosphine in the resulting mixture, whereby tris($\alpha$-hydroxy-$\beta,\beta,\beta$-trichloroethyl) phosphine is precipitated, separating the solid tris($\alpha$-hydroxy-$\beta,\beta,\beta$-trichloroethyl) phosphine from the resulting slurry, washing the separated solid with water, and drying the solid.
7. The process of claim 6 wherein said acid is hydrochloric acid.
8. The process of claim 6 wherein said resulting acidified solution contains between about twenty-five and about ninety percent water by weight.
9. The process of claim 6 wherein said resulting acidified solution has a pH of less than about two.

10. The process for destroying fungus which comprises exposing the fungus to a lethal concentration of tris(α-hydroxy-β,β,β-trichloroethyl) phosphine.

11. The process for destroying fungus which comprises exposing said fungus to a lethal concentration of tris(α-hydroxy-β,β,β-trichloroethyl) phosphine and an inert fungicidal adjuvant as a carrier.

12. An agricultural fungicidal composition of matter consisting essentially of a minor proportion of fungicide and a major proportion of inert diluent wherein said fungicide comprises tris(α-hydroxy-β,β,β-trichloroethyl) phosphine and said inert diluent is selected from the group consisting of: water, benzene, kieselguhr, wood flour, comminuted walnut shells and talc.

References Cited in the file of this patent

UNITED STATES PATENTS

| | | |
|---|---|---|
| 2,900,416 | Stewart | Aug. 18, 1959 |
| 2,902,517 | Schmerling | Sept. 1, 1959 |
| 2,906,661 | Baker | Sept. 29, 1959 |
| 2,911,335 | Gilbert | Nov. 3, 1959 |
| 2,912,465 | Ramsden | Nov. 10, 1959 |

UNITED STATES PATENT OFFICE
CERTIFICATE OF CORRECTION

Patent No. 3,054,718                               September 18, 1962

Irving Gordon et al.

It is hereby certified that error appears in the above numbered patent requiring correction and that the said Letters Patent should read as corrected below.

Column 3, line 12, for "equeous" read -- aqueous --; line 38, for "perecnt" read -- percent --; column 4, line 40, for "95" read -- 99 --.

Signed and sealed this 29th day of October 1963.

(SEAL)
Attest:

ERNEST W. SWIDER                           EDWIN L. REYNOLDS
Attesting Officer                           Acting Commissioner of Patents